Oct. 2, 1951 R. M. HAUCK 2,569,632
JOINT
Filed Sept. 12, 1949
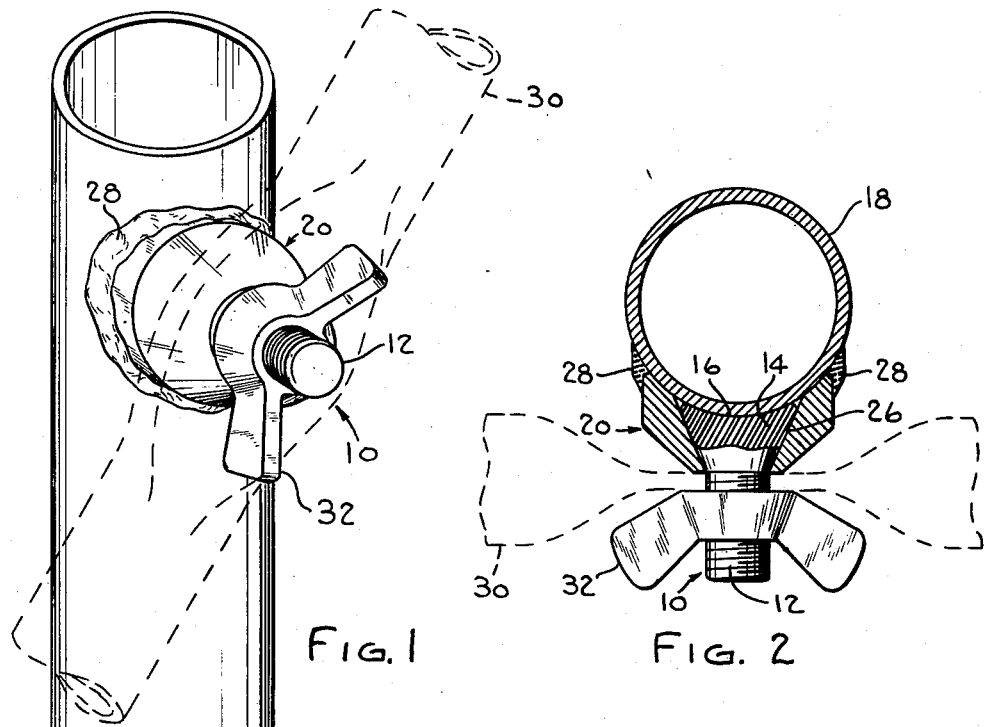
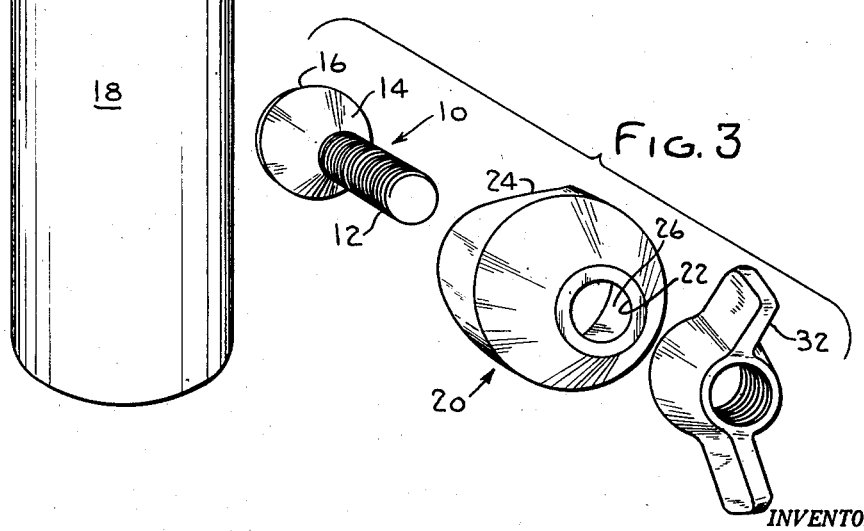
INVENTOR.
ROBERT M. HAUCK
BY
John W. Michael
ATTORNEY Patented Oct. 2, 1951

2,569,632

UNITED STATES PATENT OFFICE 2,569,632

JOINT

Robert M. Hauck, Milwaukee, Wis., assignor to Safway Steel Products, Inc., Milwaukee, Wis., a corporation of Wisconsin Application September 12, 1949, Serial No. 115,227

4 Claims. (Cl. 287—20.2)

This invention relates to means for securing dissimilar metal parts and particularly to rigidly mounting a metal stud on a dissimilar metal.

This joint makes the mounting of a ferrous stud on an aluminum member practical and simple. This is particularly advantageous in the scaffolding and allied industries which erect structures on the site from standardized units. Each unit is generally made of tubular members welded together, and adjacent units are often tied together by cross braces secured to the units by means of wing nuts threaded onto studs mounted on the tubular members. Since the scaffolding has heretofore been tubular steel, there has been no particular problem in mounting steel studs on the members where desired. The lightness and present strength of aluminum alloys makes this material very attractive for scaffolding since the handling would be greatly simplified.

While aluminum tubing has ample strength for use in compression or tension in scaffolding, it doesn't have the necessary shear strength to be utilized for studs. Steel studs do have the required shear strength but, as is well known, it is not possible, as a practical matter, to weld steel to aluminum. With the present mounting, however, the steel stud may be rigidly secured to the aluminum tubing. A stud mounted in this manner will successfully meet all the strength and safety requirements encountered by the trade.

An object of this invention is, therefore, to provide means for mounting a stud on a dissimilar metal member.

Another object is to provide means for securing a ferrous stud to a non-ferrous metal.

A further object of this invention is to provide means for mounting a ferrous stud on an aluminum tube.

A still further object is to provide a simple inexpensive joint for securing a ferrous stud to non-ferrous tubing and making the use of aluminum scaffolding practical and desirable.

Other objects and advantages will be pointed out in, or be apparent from, the specification and claims, as will obvious modifications of the single embodiment shown in the drawings, in which:

Fig. 1 is a perspective view showing one stud mounted on a tube;

Fig. 2 is a horizontal section through a mounted stud; and

Fig. 3 is an exploded perspective view of a stud, mounting cap and wing nut.

The simple joint illustrated in the drawings provides a practical and inexpensive method for mounting a steel stud on aluminum tubing. The steel stud 10 has a threaded body 12 and a generally frusto-conical head 14 provided with a curved base 16 substantially complementary to the curvature of the cylindrical aluminum tubing 18. The curved base 16 of the stud head is adapted to seat against the tubing when the stud is mounted on the tube by means of a belled aluminum cap 20 which is provided with a central aperture 22 and a curved base 24 adapted to seat against the tubing. The hollow, frusto-conical interior 26 of the cap 20 fits over and embraces the head 14 of the stud 10 with the threaded stud body 12 projecting through the aperture 22. The curved stud base 16 and the curved cap base are seated on the tube in the desired location, and the aluminum cap is welded to the aluminum tubing as at 28.

The continuous weld 28 positively positions the stud on the tubing. Since the base of the stud provides a fairly large seating area between the stud and the tube, the stud can't be wiggled with respect to the tube. Since the stud base curvature is complementary to the tubing curvature, the stud can't be rotated about its axis. Thus the stud is held rigidly on the tubing.

The strength of this welded mounting is great and, since the stud may be steel, the shear strength is more than ample for the stresses encountered in use. As pointed out above, the principal use presently contemplated is in the scaffolding industry where cross members are used to brace adjacent units. The drawings show a tubular cross brace 30 having an apertured flattened portion fitting over the stud and held in place by means of a wing nut 32 in the conventional manner permitting rapid erection and disassembly without use of special tools.

This simple, efficient joint is completely practical and makes possible the use of aluminum and its alloys in scaffolding with a resultant material decrease in weight. The joint may be used in mounting any metal on a dissimilar metal to overcome the welding problem. As used in the specification and claims the word "aluminum" is intended to include aluminum alloys. While this joint is particularly advantageous in mounting studs on cylindrical tubing, it will be apparent that modifications to adapt the joint for mounting studs on flat surfaces will occur to those skilled in the art. Similarly, the instant joint may be modified to some extent. Such modifications are considered to be within the spirit of this invention and for this reason the scope of the invention is to be limited only by the breadth of the claims.

I claim:

1. A joint comprising, a non-ferrous cylindrical tube, a non-ferrous belled cap having a generally frusto-conical interior and a curved base conforming to the curvature of said tube, said cap being welded to said tube and having an aperture at the small end of the frusto-conical interior, a ferrous stud having a generally frusto-conical head fitting within the interior of said cap with a curved base abutting said tube and a body projecting through said aperture.

2. A joint comprising, a cylindrical aluminum tube, a belled aluminum cap having a generally frusto-conical interior and a curved base conforming to the curvature of said tube, said aluminum cap being welded to said aluminum tube and having an aperture at the small end of said frusto-conical interior, and a ferrous stud having a generally frusto-conical head fitting snugly within said interior with a curved base conforming to and abutting said tube, said stud including a body projecting through said aperture.

3. A joint comprising, a cylindrical aluminum tube, a generally frusto-conical belled aluminum cap having a generally frusto-conical interior and provided with a curved base substantially conforming to the curvature of said tube, said aluminum cap being welded to said tube and having an aperture at the small end of said frusto-conical interior, and a steel stud having a generally frusto-conical head fitting snugly within said interior and a curved base conforming to and abutting said tube to positively position the stud with respect to said tube, said stud including a threaded body projecting through said aperture and adapted to receive a nut.

4. A joint comprising a cylindrical tube, a hollow cap having a generally frusto-conical interior wall, the cap having a base provided with a transversely extending concavity generally arcuate in cross section and conforming to the exterior surface of the tube, the opposite end of the cap being apertured, a stud having a head generally frusto-conical in shape and dimensioned to fit snugly within the frusto-conical interior of the cap, the head of the stud being provided with a transversely extending concavity, arcuate in cross section and conforming generally to the outer surface of the tube, the head of the stud being seated snugly within the frusto-conical interior of the cap, the stud having a shank portion projecting through said aperture, the transverse concavities in the cap and stud head being positioned to complementally define a concavity having an arcuate surface conforming generally to the exterior surface of the tube, the tube being seated within said last mentioned concavity, and means securing the cap to the tube.

ROBERT M. HAUCK.

REFERENCES CITED

The following references are of record in the file of this patent:

UNITED STATES PATENTS

| Number | Name | Date |
| --- | --- | --- |
| 148,505 | Saladee | Mar. 10, 1874 |
| 1,122,289 | Loveland | Dec. 29, 1914 |
| 1,477,657 | Meyer | Dec. 18, 1923 |
| 1,937,197 | Halladay | Nov. 28, 1933 |
| 2,174,693 | Early | Oct. 3, 1939 |

FOREIGN PATENTS

| Number | Country | Date |
| --- | --- | --- |
| 290,008 | Great Britain | May 10, 1928 |
| 545,887 | Great Britain | June 17, 1942 |